UNITED STATES PATENT OFFICE.

ALBERT RICKS, OF GROSS LICHTERFELDE-OST, GERMANY.

ELECTRIC-STORAGE-BATTERY PLATE.

1,051,261.   Specification of Letters Patent.   Patented Jan. 21, 1913.

No Drawing.   Application filed April 30, 1912.   Serial No. 694,248.

*To all whom it may concern:*

Be it known that I, ALBERT RICKS, a subject of the German Emperor, and resident of Gross Lichterfelde-Ost, Germany, have invented certain new and useful Improvements in or Relating to Electric-Storage-Battery Plates, of which the following is a specification.

It has hitherto been proposed to produce active material of a crystalline nature for electric storage battery plates by forming electrolytic deposits on lead plates in the form of thin sheets, then cleaning the sheets by means of steam or distilled water preferably while still on the plates and drying them and subsequently removing the substance from the lead plates and putting it into a cylindrical sieve or disintegrator and breaking it up into small particles of a visibly crystalline nature. The material thus produced possesses an extraordinarily high capacity which may be further increased by a small addition of mercury salts such as mercuric sulfate. In spite of its high capacity, however, this material does not possess sufficient durability. When this material (without the sulfate) is mixed in relatively small quantities with such lead oxids or preparations as are usually employed in the formation of active material in the manner in which it has hitherto been suggested with finely divided lead produced according to other processes, the resultant material (finely divided lead) possesses not only a considerably higher capacity than is obtained by the use of red lead, litharge, lead powder and other lead compounds alone but also a greater durability. Although the material obtained electrolytically in the form of thin sheets as above referred to and consisting not of pure lead but of a hydrogenized lead compound does not, as a paste, offer sufficient rigidity or strength, yet it acts as a hardening agent and at the same time serves to increase the capacity when added to the lead oxids usually employed for producing the paste. This mixture can be given a lasting and very high mechanical strength by the additional use of binding agents which under the influence of the current and acid are not prematurely destroyed and by which moreover the resistance of the plates is not rendered excessively high. The known binding agents consist partly of such substances by which the mass is mechanically cemented and partly of substances which with a frictional amount of lead oxids form as a rule basic lead compounds. The former, it is true, impart to the mass a sound mechanical strength but as a rule they increase its resistance and considerably reduce its capacity whereas the latter are liable to be soon destroyed owing to the constant influence of the current during charging and discharging. Not every binding agent, however, admits of being used readily with another, for experience has shown that frequently the opposite is obtained of what was desired. Excellent binding agents for a mixture of lead oxids with the material produced electrolytically in the form of thin sheets as above mentioned are albuminous bodies such as protein, albumen and the like, particularly when used with a hardening agent of that group forming conducting compounds with lead oxids such as phenol, acetic acid, salicylic acid, pyridin and the like. By stirring an emulsion of a very small percentage of such an albuminous substance preferably in diluted sulfuric acid, with a slight addition of phenol or the like and mixing it with a mass composed of lead oxids and an addition of the crystalline material produced electrolytically in the form of thin sheets, a paste is obtained which not only has great rigidity or strength but also a higher capacity than the usual active material or the crystalline active material previously referred to. No addition of mercuric sulfate is made in this case as it attacks the grids but broken up glass wool in the form of short hairy or fibrous particles of only a length of 3 to 15 mm., according to the thickness of the battery plates, may be added if desired for the purpose of allowing a quick charging and discharging owing to the fine threads of the glass wool exerting a capillary action which in the event of irregularities in the composition of the liquids within and without the plates acts as a rapid equalizer. The use of glass wool for such purposes is known but its presence in the usual active material tends to lessen the durability of the latter. As in storage battery plates produced according to this invention the mass possesses an extraordinarily high degree of hardness the addition of glass wool has in this case a very favorable influence.

Having now particularly described and ascertained the nature of said invention, and in what manner the same is to be performed, I declare that what I claim is:

1. A battery plate comprising a mixture of lead oxid and an electrolytically formed active substance, an albuminous substance mingled therewith and a hardening agent applied thereto, the said agent when in the presence of lead having the property of forming a conductive compound.

2. A battery plate containing a mixture of lead oxid and electrolytically formed lead, an albuminous substance mingled therewith and a hardening agent applied thereto, the said agent when in the presence of lead having the property of forming a conductive compound.

3. An active material for a battery, comprising a mixture of lead oxid, electrolytically formed lead, an albuminous substance, and a hardening agent comprising sulfuric acid and phenol.

In testimony whereof I have hereunto set my hand in presence of two witnesses.

ALBERT RICKS.

Witnesses:
WOLDEMAR HAUPT,
HENRY HASPER.